(12) United States Patent
Hymer

(10) Patent No.: US 11,465,739 B2
(45) Date of Patent: Oct. 11, 2022

(54) VERTICAL TAKE OFF AND LANDING FIXED WING AIRCRAFT

(71) Applicant: Hi-Lite Aircraft, Bannister, MI (US)

(72) Inventor: Jeffrey Hymer, Bannister, MI (US)

(73) Assignee: Hi-Lite Aircraft, Webberville, MI (US)

( * ) Notice: Subject to any disclaimer, the term of this patent is extended or adjusted under 35 U.S.C. 154(b) by 211 days.

(21) Appl. No.: 16/981,902

(22) PCT Filed: Apr. 19, 2019

(86) PCT No.: PCT/US2019/028259
§ 371 (c)(1),
(2) Date: Sep. 17, 2020

(87) PCT Pub. No.: WO2019/204688
PCT Pub. Date: Oct. 24, 2019

(65) Prior Publication Data
US 2021/0107639 A1      Apr. 15, 2021

Related U.S. Application Data

(60) Provisional application No. 62/659,869, filed on Apr. 19, 2018.

(51) Int. Cl.
*B64C 29/00*         (2006.01)
(52) U.S. Cl.
CPC ................. *B64C 29/0033* (2013.01)
(58) Field of Classification Search
CPC .. B64C 29/0033; B64C 29/0075; B64C 27/28
See application file for complete search history.

(56) References Cited

U.S. PATENT DOCUMENTS 2,411,271 A    11/1946   Jackson
2,426,742 A     9/1947   Pawlowski
(Continued)

FOREIGN PATENT DOCUMENTS

DE    102007057077 A1    5/2009
DE    102008008060 A1    5/2009
(Continued)

*Primary Examiner* — Richard R. Green
*Assistant Examiner* — William L Gmoser
(74) *Attorney, Agent, or Firm* — Endurance Law Group PLC

(57) ABSTRACT

A VTOL fixed wing aircraft capable of high-speed forward flight. The aircraft has a main wing internally reinforced with front and aft spars. Spar boxed are located in roll-balanced locations along the wing. Each spar box serves as a connection point for a support linkage that supports a leading-edge and trailing-edge propulsion unit. The leading-edge propulsion unit is fitted with a puller propeller and designed for articulated movement between a VTOL position in front of the wing leading edge and a forward flight position below the wing leading edge. The trailing-edge propulsion unit is fitted with a pusher propeller and designed for articulated movement between a VTOL position in behind the wing trailing edge and a forward flight position above the wing leading edge. The propeller includes a propulsor thrust ring having an aerodynamic profile and a thrust nozzle to capture and vector radial air leakage into thrust.

17 Claims, 11 Drawing Sheets

(56) References Cited

U.S. PATENT DOCUMENTS

| | | | |
|---|---|---|---|
| 3,165,280 A | | 1/1965 | Shao-Tang |
| 3,273,827 A | | 9/1966 | Girard |
| 3,439,888 A | | 4/1969 | Dancik |
| 3,445,079 A | * | 5/1969 | Burns ................. B64C 29/0075 244/54 |
| 4,093,155 A | | 6/1978 | Kincaid |
| 4,289,450 A | | 9/1981 | Kling |
| 5,096,382 A | | 3/1992 | Gratzer |
| 6,655,631 B2 | | 12/2003 | Austen-Brown |
| 7,850,116 B2 | | 12/2010 | Stuhr |
| 9,187,174 B2 | | 11/2015 | Shaw |
| 9,643,720 B2 | * | 5/2017 | Hesselbarth ........ B64C 29/0033 |
| 2010/0166556 A1 | | 7/2010 | Kirtley |
| 2015/0136897 A1 | | 5/2015 | Seibel et al. |
| 2015/0175260 A1 | | 6/2015 | Hesselbarth |

FOREIGN PATENT DOCUMENTS

| | | |
|---|---|---|
| GB | 768190 A | 2/1957 |
| WO | 2017077144 A1 | 5/2017 |

\* cited by examiner

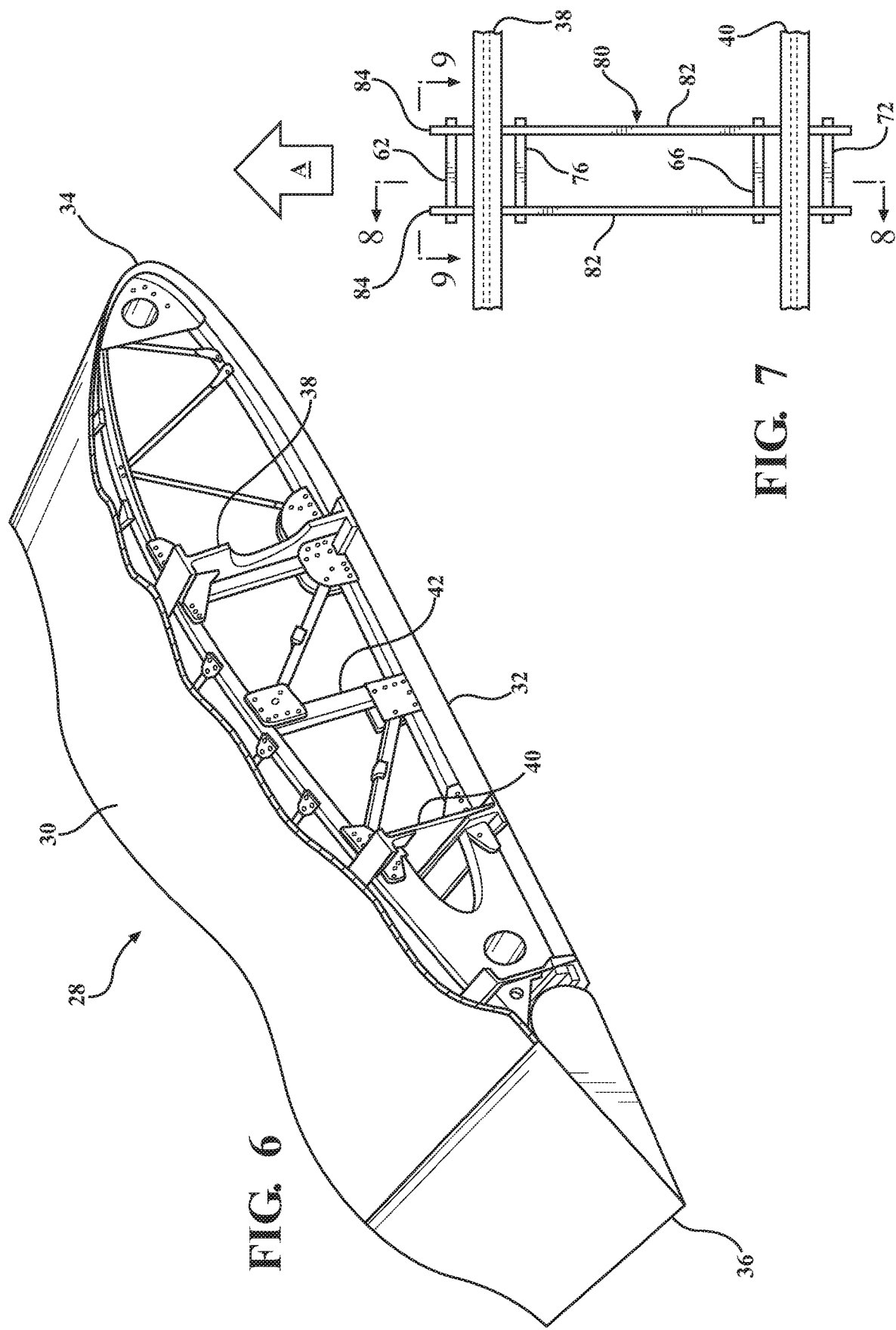

VERTICAL TAKE OFF AND LANDING FIXED WING AIRCRAFT

CROSS REFERENCE TO RELATED APPLICATIONS

This application claims priority to U.S. Provisional Patent Application 62/659,869 filed on Apr. 19, 2018, the entire disclosure of which is hereby incorporated by reference and relied upon.

BACKGROUND OF THE INVENTION

Field of the Invention

The invention relates generally to vertical take-off and landing (VTOL) fixed wing aircraft and propulsion units therefor.

Description of Related Art

Transportation is fundamental to connect people, business and services. Since the early days of aviation, designers and engineers in both the commercial and military aerospace fields have envisioned fixed wing aircraft capable of taking off from a runway no larger than its own shadow, and then transitioning to high speed forward flight. However, the reality of vertical take-off and landing (VTOL) flight for high performance commercial aircraft and military fighters have proven to be a perplexing and obsessive goal. Helicopters and Autogyros, both types of VTOL but of non-fixed wing aircraft types, are often deemed too fragile, too slow and too vulnerable for safe air commerce and/or aerial combat.

The well-known "VTOL Wheel" produced by AHS International of Fairfax, Va. together with its Vertipedia database list some forty-five various aircraft types within the broad category of VTOL capable. Within these forty-five aircraft types, some fifteen various thrust options and some four different propulsion methods can be observed. To date there has been several successful high-speed military VTOL aircraft. These include the MD AIBAE A V-8 Harrier and Lockheed Martin F-35 incorporate rotating jet nozzles thrust vectoring and/or lift fan technology.

Notwithstanding past and present accomplishments in the VTOL field, there is a continuing need and desire to design, develop and demonstrate a VTOL fixed wing aircraft with exceptional performance in vertical and cruise flight and operational capability through transition from vertical to forward flight. A particular goal for VTOL fixed wing aircraft is sustained high-speed forward flight in the range of about ~200 kt and 400 kt.

Many such aircraft seeking to meet these design criteria utilize open-exposed rotors or propellers that rotate between VTOL and flight modes. However, there is an ever-present concern that open-exposed rotors or propellers within the human safety zone could be hazardous and create excessive noise issues. In hostile military environments, open-exposed rotors or propellers are also more vulnerable to flying metal shrapnel and small arms fire. Another downside to rotating engines or propellers is that rotation changes the thrust point. Rotating mechanisms, and the dedicated power supplies that are needed to provide the mechanical rotating transition, add significantly to center of gravity issues and make it very difficult to sustain controlled flight.

Many such aircraft seeking to meet high design criteria such as these utilize open, exposed rotor blades and propellers that rotate between VTOL and flight modes. These commonly include tilt rotor and tilt wing designs. However, there is an ever-present concern that open, exposed rotor blades and propellers pose serious safety hazards. Additionally, complex rotating turbo-machinery is subject to increased malfunctions and failures due to the inherent physical loads with rotating center of gravity (CG) limits and aerodynamic instabilities. The one engine out envelope is of critical concern, requiring heavy complex cross shafting mechanisms. An adverse consequence inherent in the design of tilt wing, tilt motor aircraft is that high rotor blade forces tend to interact violently on the leading edge of the main wing. The prop wash beating the leading edge can produce exterior skin and interior structural (spar) cracking and fatigue issues.

There is therefore a need in the art for improved VTOL fixed wing aircraft that are safe and efficient, that are capable of extended ranges, higher speeds, greater payloads, lower noise signatures, and lower carbon footprints and reduced operating costs.

BRIEF SUMMARY OF THE INVENTION

According to a first aspect of this invention a fixed wing assembly is provided for an aircraft capable of vertical take-off and landing (VTOL) maneuvers and forward flight. The assembly comprises a main wing having an upper surface and an opposite lower surface. The upper surface is configured to produce lift by accelerating the free flow of air thereover relative to the lower surface. The main wing has a leading edge and a trailing edge. The main wing has a front spar and an aft spar. The front and aft spars are arranged generally parallel to one another. A combination VTOL and forward flight propulsion system is supported from the main wing. The propulsion system includes at least one articulating propulsor pair operatively stationed on the main wing. The articulating propulsor pair comprises a leading-edge propulsion unit adjacent the leading edge of the wing and a trailing-edge propulsion unit adjacent the trailing edge of the wing. A leading unit mounting structure supports the leading-edge propulsion unit for articulated movement between VTOL and forward flight positions. The leading unit mounting structure includes a leading swing arm operatively connected to the leading-edge propulsion unit. The leading unit mounting structure includes a leading linear actuator operatively connected to the leading-edge propulsion unit. A trailing unit mounting structure supports the trailing-edge propulsion unit for articulated movement between VTOL and forward flight positions. The trailing unit mounting structure includes a trailing swing arm operatively connected to the trailing-edge propulsion unit. The trailing unit mounting structure includes a trailing linear actuator operatively connected to the trailing-edge propulsion unit. The leading swing arm has a leading swing pivot disposed adjacent the front spar. The leading linear actuator has a leading actuator pivot disposed adjacent the aft spar. And the trailing swing arm has a trailing swing pivot disposed adjacent the aft spar. The trailing linear actuator has a trailing actuator pivot disposed adjacent the front spar.

The novel arrangements of propulsion units and their corresponding mounting structures improve the structural integrity achieved by locating the several pivots nearly directly on the front and aft spars. The strategic placement of these pivots also enables large degrees of rotation, which allows for improved control in VTOL and forward high-speed flight. In VTOL mode, the propulsion units produce a low-pressure area above the wing thus adding to the overall lift ability of the aircraft. In VTOL mode, the propulsion units produce a high-velocity airflow downward to produce lift. In VTOL mode, the arc of the propulsion units can be optimized within the lower width of the wing structure to assure maximum capabilities for producing a low-pressure area above the wing upper surface. Still further, the novel mounting structures enable strategic positioning of the propulsion units in both VTOL and forward flight modes so that prop wash can be maintained clear of the aircraft structures. In both high and low speed forward flight, the pull and push of airflow is designed with respect to the airfoil of the wing so that airflow is over and under creating a beneficial "blown wing" effect.

According to a second aspect of this invention, a combination VTOL and forward flight propulsion system is provided of the type to be supported from the main wing of an aircraft. The main wing has a leading edge and a trialing edge and an upper surface and a lower surface. The propulsion system comprises a leading-edge propulsion unit adapted for placement adjacent the leading edge of a wing. A trailing-edge propulsion unit is adapted for placement adjacent the trailing edge of the wing. A leading unit mounting structure supports the leading-edge propulsion unit for articulated movement between VTOL and forward flight positions. The leading unit mounting structure includes a leading swing arm operatively connected to the leading-edge propulsion unit. The leading swing arm has a leading swing pivot. The leading unit mounting structure includes a leading linear actuator operatively connected to the leading-edge propulsion unit. A trailing unit mounting structure supports the trailing-edge propulsion unit for articulated movement between VTOL and forward flight positions. The trailing unit mounting structure includes a trailing swing arm operatively connected to the trailing-edge propulsion unit. The trailing swing arm has a trailing swing pivot. The trailing unit mounting structure includes a trailing linear actuator operatively connected to the trailing-edge propulsion unit. And a spar box mechanically interlocks the leading swing pivot and the leading actuator pivot and the trailing swing pivot and the trailing actuator pivot as a unit.

The spar box can be designed to function as the main support structure that carries the high loads of the articulating propulsion units.

According to a third aspect of this invention, a propeller is adapted for operative attachment to the output shaft of a propulsion motor for a fixed wing aircraft assembly. The propeller comprises a hub defining a rotary axis. A plurality of blades extend radially from the hub. Each blade terminates at a distal tip. An annular propulsor thrust ring is concentrically disposed about the hub. The propulsor thrust ring joins each of the tips of the blades into a monolithic structure. The propulsor thrust ring has an aerodynamic cross-sectional profile as taken in a radial plane intersecting the rotary axis of the hub. The aerodynamic profile has an interior surface and an exterior surface. The interior and exterior surfaces of the aerodynamic profile converge at leading and trailing rims. The aerodynamic profile has a PTR angle of attack (AOA) that is generally parallel to or diverging relative to the rotary axis. And, the trailing rim has a thrust nozzle that conically converges airflow toward the rotary axis at a thrust angle ($\ominus$) measured with respect to the PTR angle of attack (AOA).

The propulsor thrust ring captures radial air leakage and its thrust nozzle vectors that radial air flow into valuable thrust. The propulsor thrust ring also captures and deflects undesirable sounds and heat that may otherwise be directed toward the fuselage. As a result, the propeller of the present invention is more efficient and quieter than traditional open bladed propeller designs. Furthermore, the propulsor thrust ring eliminates induced drag around the distal tips of the blades. The propulsor thrust ring represents a safety improvement over traditional open bladed propeller designs. The propulsor thrust ring adds structural integrity to the propeller by connecting the distal tips of the blades. Similarly, the low vibration harmonics will be improved by the propeller of this invention. For all of these reasons, the propeller is desirable as an ultra-efficient propulsor having a much lower noise signature than traditional designs. As a result, the propeller may be designed to rotate at slower RPM while producing more thrust at lower noise levels. The propulsor thrust ring has an airfoil shape that produces a low-pressure area around the propeller adding to its overall efficiency.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 6 is a fragmentary perspective view of an exemplary main wing of a fixed wing aircraft broken away to reveal common interior supporting structures including front and aft spars;

FIG. 7 is a highly simplified top view of a spar box according to an embodiment of this invention, the spar box extending between and interconnecting the front and aft spars of a wing;

DETAILED DESCRIPTION OF THE INVENTION

Figure 1:
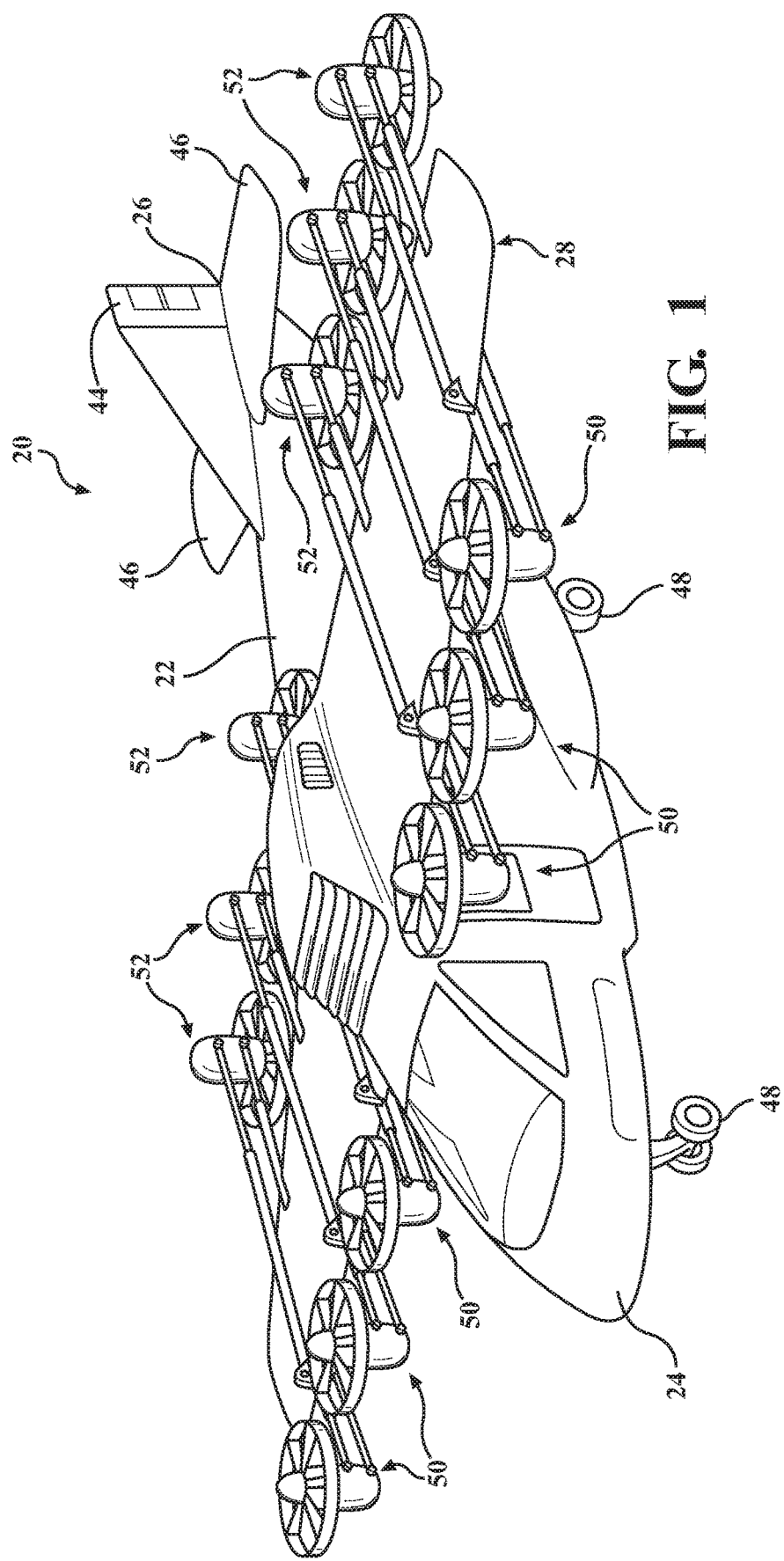
FIG. 1 is a perspective view of an aircraft according to one embodiment of the present invention having propulsion systems configured for vertical take-off and landing (VTOL) maneuvers.
Figure 2:
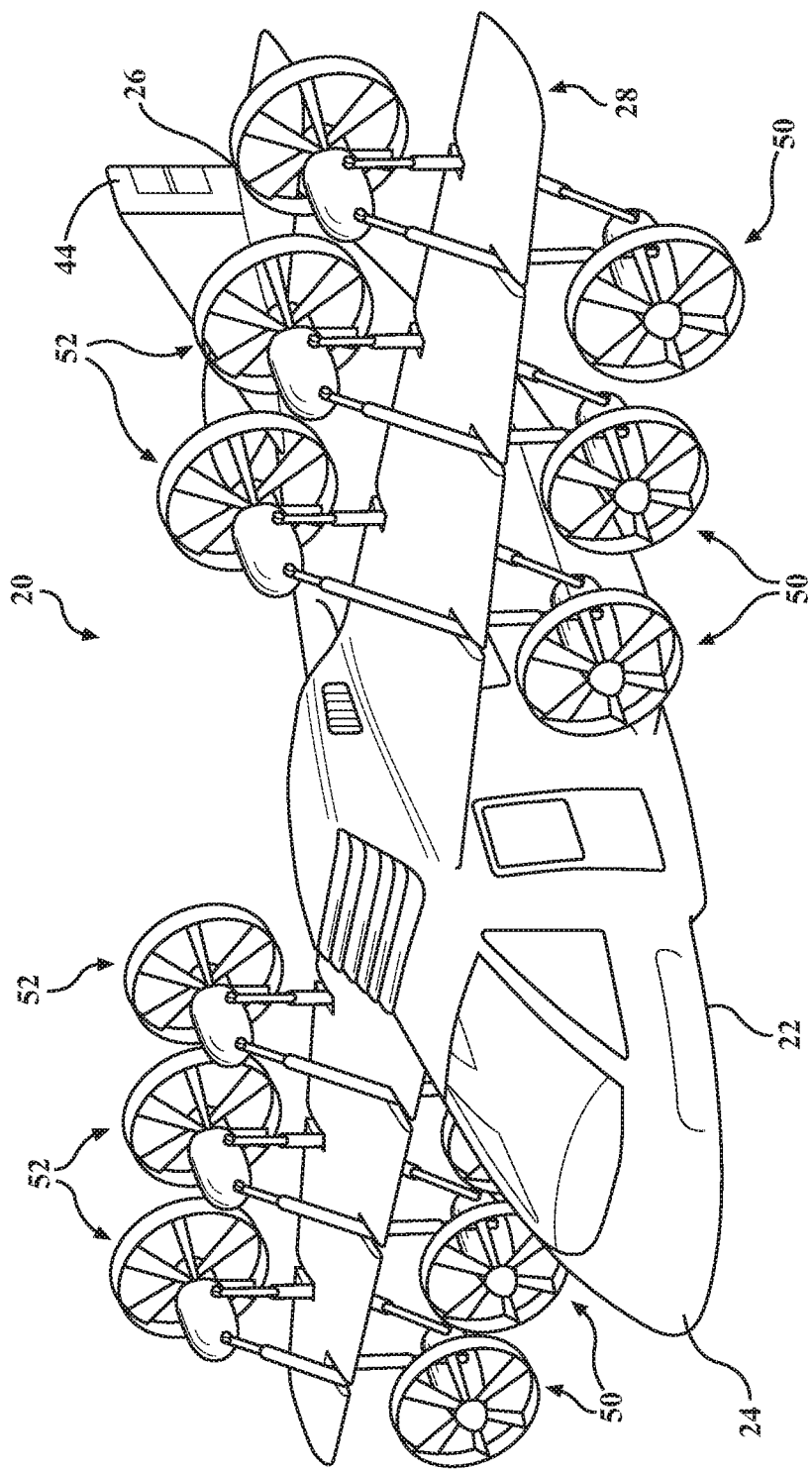
FIG. 2 is a perspective view of the aircraft in FIG. 1 wherein the propulsion systems are configured for forward flight.
Figure 3:
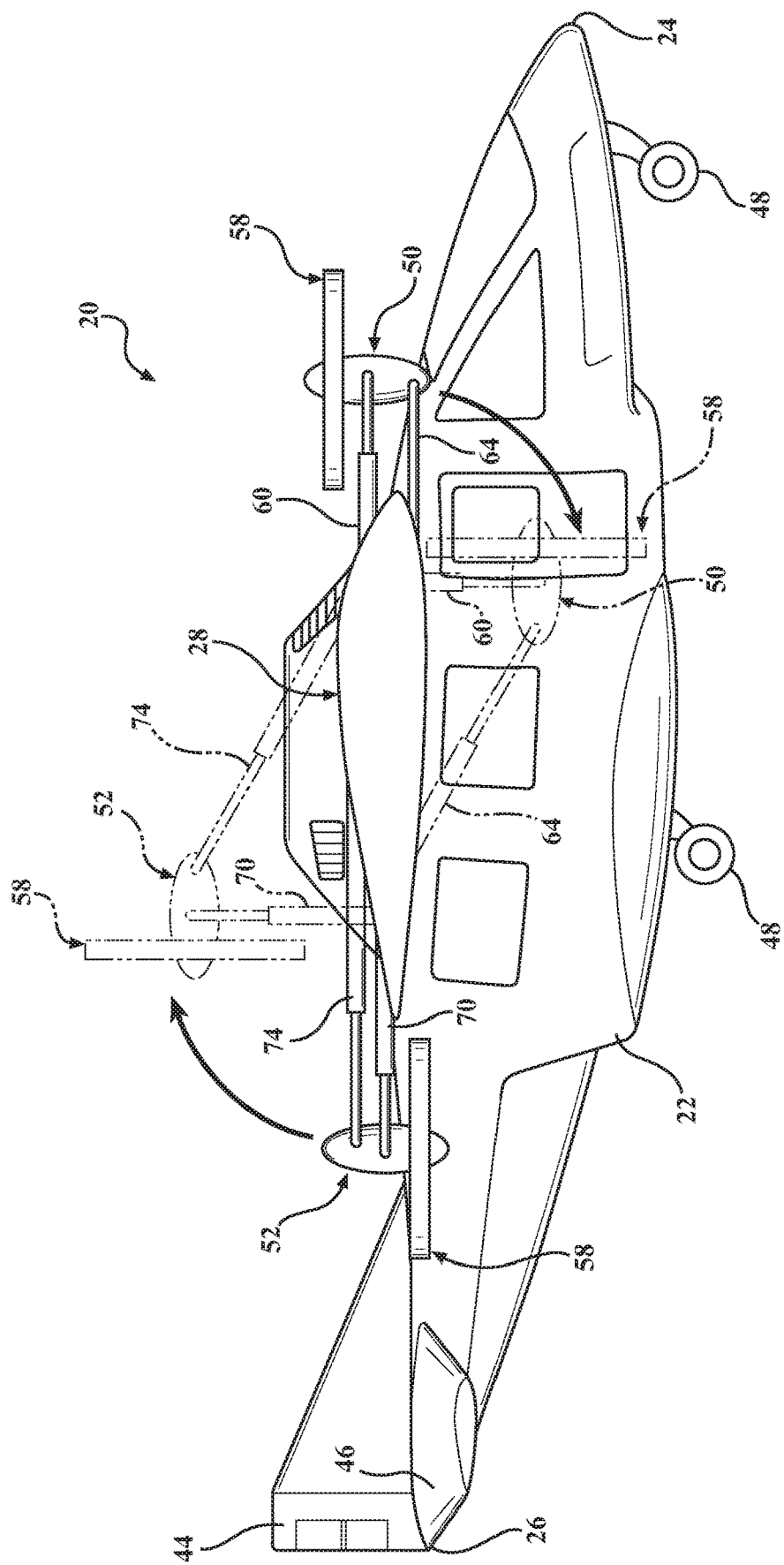
FIG. 3 is a side view of the aircraft in FIG. 1 showing the propulsion systems in VTOL mode in solid lines and forward flight mode in phantom lines.

An exemplary fixed wing aircraft assembly is generally shown at 20 in FIGS. 1-3. The aircraft assembly 20 is of the type capable of vertical take-off and landing (VTOL) maneuvers and forward flight. FIG. 1 shows the aircraft 20 configured for VTOL maneuvers, whereas FIG. 2 shows the aircraft 20 configured for forward flight.

The aircraft 20 may take many different forms and is shown in FIGS. 1-3 as having a somewhat conventional airframe comprised an elongated fuselage 22 extending between nose 24 and tail 26 ends. The airframe includes at least one main wing, generally indicated at 28. The main wing 28 is fixed to the fuselage 22 between the nose 24 and tail 26 ends. The main wing 28 can, of course, take a wide variety of forms. In one contemplated embodiment (not shown) the main wing 28 is part of a multi-wing set, e.g. a bi-plane or tri-wing plane configuration. In another contemplated embodiment (not shown) the main wing 28 is mounted under the fuselage rather than above as shown in FIGS. 1-3. In a still further contemplated embodiment (not shown) the main wing 28 has a swept back of delta configuration. The shape and dimensional specifications for the main wing 28, as well as for the aircraft 20 overall, are subject to the determinations made by designers in view of the intended application for the aircraft 20. Indeed, the main wing 28 as depicted in FIGS. 1-3 is intended to be merely representative of the wide range of styles and implementations possible in and among all types of fixed wing aircraft 20.

The main wing 28 has port and starboard sides disposed on opposite sides of the fuselage 22 in typical fashion. In most contemplated implementations, the port and starboard sides of the main wing 28 will be of generally equal length for purposes of balance and aerodynamic symmetry. Each of the port and starboard sides of the main wing 28 will have an upper surface 30 and an opposite lower surface 32. The main wing 28 is configured in the customary manner to produce lift by accelerating the free flow of air over its upper surfaces 30 relative to the lower surfaces 32. Considering the forward direction of flight (identified by directional arrow A in FIGS. 7, 8, 10, 13 and 14), each port and starboard side of the main wing 28 can be identified as having a leading edge 34 proximate the nose 24 of the fuselage 22 and a trailing edge 36 proximate the tail 26 of the fuselage 22.

In full-scale applications for aircraft 20 intended to transport humans or human-sized cargo, the structural design of the main wing 28 will include, at least, a front spar 38 and an aft spar 40. As perhaps best shown in FIG. 6, the front and aft spars are arranged generally parallel to one another and generally perpendicular to the elongated direction of the fuselage 22. Each of the forward 38 and aft spars 40 may have a generally I-beam construction, however other shapes are certainly possible including C-shapes and box-shapes and tube-shapes to name but a few. In main wings 28 having more than two spars, any two relatively-positioned spars can be identified to represent the forward 38 and aft 40 spars. That is to say, in the hypothetical case where the main wing 28 has three spars, the forward-most spar may be designated as the front spar 38 whereas either the intermediate or rearward-most spar could be designated as the aft spar 40. Typically, ribs 42 are spaced along the spars 38, 40 to support the skin panels of the main wing 28. Many design variations are certainly possible.

Returning again to FIGS. 1-3, the aircraft 20 is shown including a variety of flight control surfaces. The flight control surfaces can take many different forms. Perhaps the most common configurations are represented for exemplary purposes only in the figures, in the forms of a rudder 44 and an elevator 46, both attached to the fuselage 22 adjacent the tail end 26. Those of skill in the art will envision other arrangements and designs for the flight control surfaces, those shown here being merely for illustrative purposes. FIGS. 1 and 3 also show the aircraft 20 including an undercarriage system in the form of wheels 48. The wheels 48 are operatively coupled to at least one of the fuselage 22 and the main wing 28, and may be of the retractable or fixed-in-place variety. Alternatively, the undercarriage system could be designed as a skid-system like that usually seen in helicopters, or as skis for snow-landings, or pontoons for water landings.

At least one combination VTOL and forward flight propulsion system is supported from the main wing 28. More preferably, at least one combination VTOL and forward flight propulsion system is supported from each of the port and starboard sides of the main wing 28. And more preferably still, a plurality of combination VTOL and forward flight propulsion systems are supported from each of the port and starboard sides of the main wing 28. In the example of FIGS. 1 and 2, a set of three combination VTOL and forward flight propulsion systems are supported on the port side of the main wing 28 and a symmetrically-balanced set of three combination VTOL and forward flight propulsion systems are supported on the port side of the main wing 28.

Each propulsion system includes at least one articulating propulsor pair. As explained above and illustrated in the examples, in most contemplated implementations of tis invention there will be one or more sets of propulsor pairs operatively stationed on each of the port and starboard sides of the main wing 28. Each articulating propulsor pair comprises a leading-edge propulsion unit, generally indicated at 50, and a trailing-edge propulsion unit, generally indicated at 52. As the names imply, the leading-edge propulsion unit 50 is located adjacent the leading edge 34 of the wing 20, whereas the trailing-edge propulsion unit 52 is located adjacent the trailing edge 36 of the wing 28.

Each propulsion unit 50, 52 comprises a motor 54. The motor 54 has an output shaft 56. In the preferred embodiments, each motor 54 comprises an electric motor. However, combustion powered motors 54 are also contemplated. Either both of the propulsion units 50, 52 may be configured as puller style devices in which the motor 54 is located downstream of a driven propeller 58, or both of the propulsion units 50, 52 may be configured as pusher style devices in which the motor 54 is located upstream of the driven propeller 58. In the illustrated examples, however, one of the leading- and trailing-edge propulsion units 50, 52 is configured as an air puller and the other propulsion unit 50, 52 is configured as an air pusher. And more specifically, the illustrations depict a design in which the leading-edge propulsion unit 50 is configured as an air puller and the trailing-edge propulsion unit 52 configured as an air pusher.

Referring now to FIGS. 1-5, the leading-edge propulsion unit 50 will be described in greater detail. To facilitate descriptions, throughout this document features relating specifically to the leading-edge propulsion unit 50 will be named with the word "leading." The leading-edge propulsion unit 50 includes a leading unit mounting structure that supports the leading-edge propulsion unit 50 for articulated movement between its VTOL and forward flight positions. This functionality of the leading unit mounting structure is perhaps best seen in FIG. 3 where the leading-edge propulsion unit 50 is shown in the VTOL position in solid lines, and in the forward flight position in broken lines.

Figure 4:
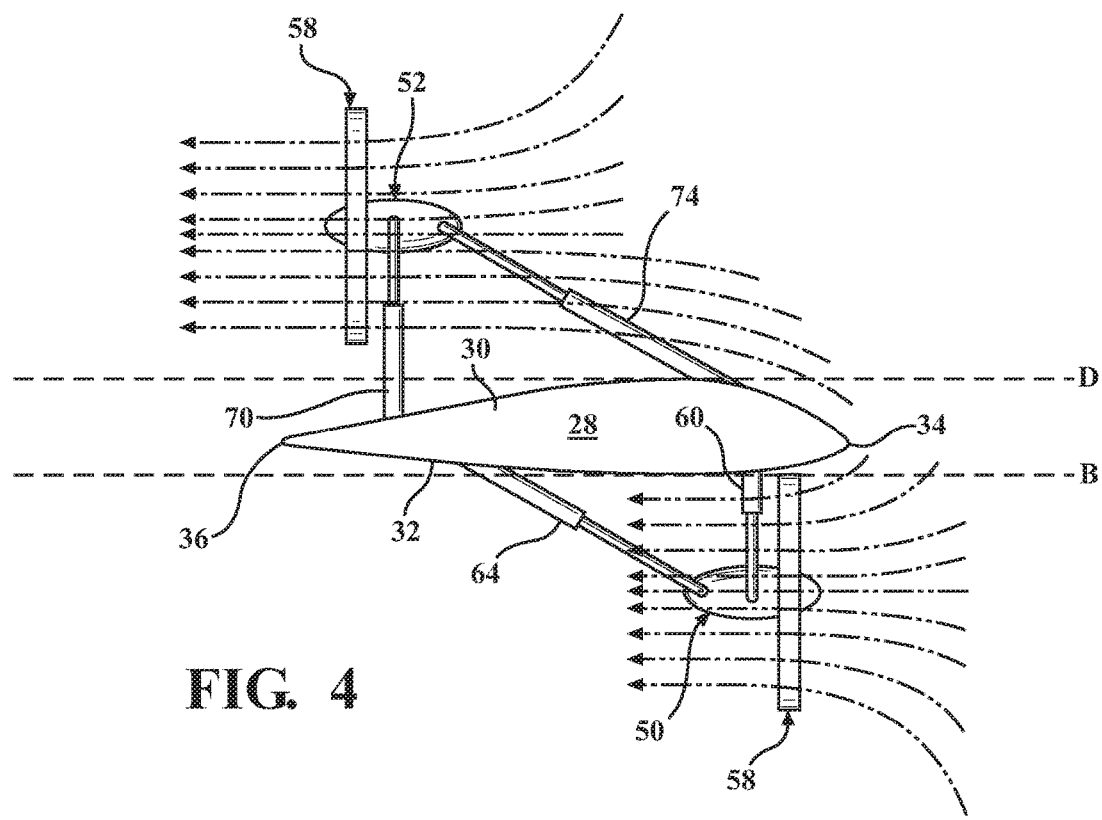
FIG. 4 illustrate a combination VTOL and forward flight propulsion system according to one embodiment of the invention supported from the main wing of a fixed wing aircraft and configured for forward flight with air currents influenced by the respective propellers.

When in the forward flight position, the leading-edge propulsion unit 50 is located below the main wing 28, proximate its leading edge 34. Ideally, the propeller 58 of the leading-edge propulsion unit 50 will be located so that its maximum diameter is at or below a horizontal tangent line B as shown in FIG. 4. The horizontal tangent line B touches the lowest point of the lower surface 32 of the wing 28. Air drawn in through the propeller 58 on the leading-edge propulsion unit 50 during forward flight will develop a low-pressure zone in front of the leading edge 34 and a corresponding high-pressure zone below the lower surface 32 of the main wing 28. In addition to the forward thrust generated by the leading-edge propulsion unit 50, the strategic arrangement of low- and high-pressure zones relative to the wing 28 in forward flight mode will facilitate forward flight as well as lift.

Figure 5:
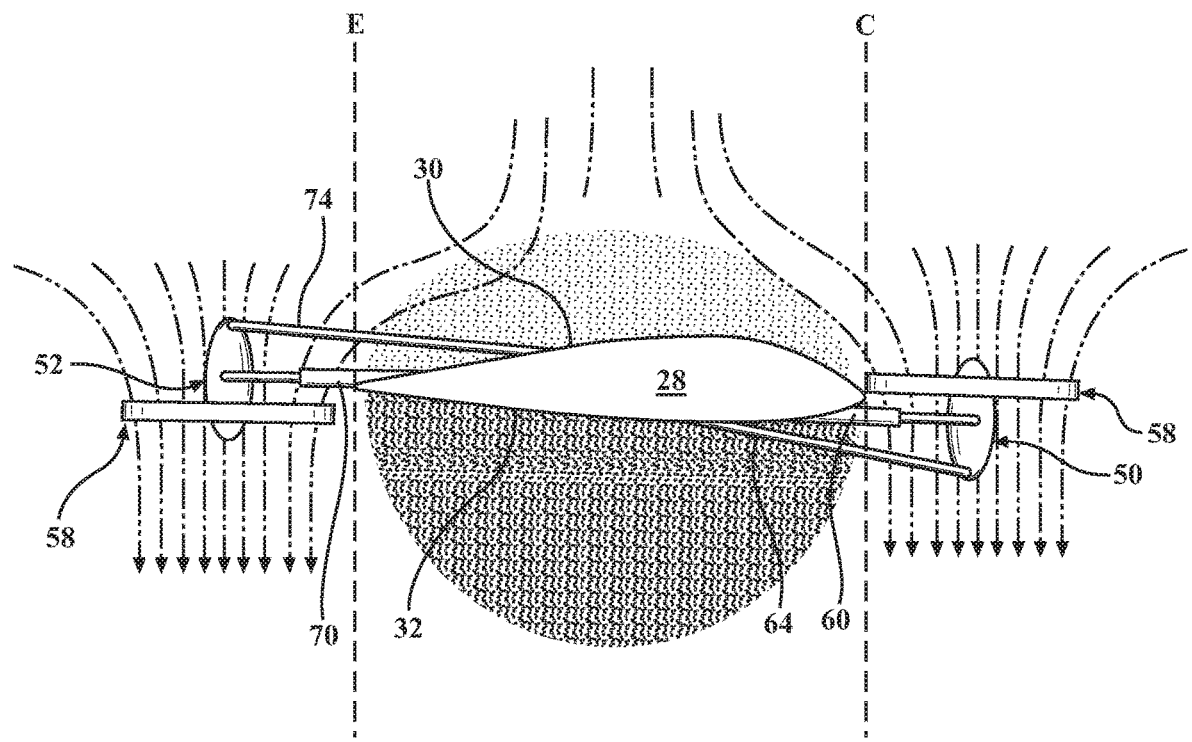
FIG. 5 is a view as in FIG. 4 but showing the propulsion system configured for vertical take-off and landing (VTOL) maneuvers with air currents influenced by the respective propellers to produce a low-pressure zone over the wing and a high pressure zone under the wing.

When in the VTOL position, the leading-edge propulsion unit 50 is located in front of the leading edge 34 of the main wing 28, preferably slightly above the leading edge 34. Ideally, the propeller 58 of the leading-edge propulsion unit 50 will be located so that its maximum diameter is at or in front of a vertical tangent line C as shown in FIG. 5. Air drawn in through the propeller 58 on the leading-edge propulsion unit 50 during VTOL will develop a low-pressure zone above the upper surface 30 of the wing 28 and a corresponding high-pressure zone below the lower surface 32 of the main wing 28. The strategic arrangement of low- and high-pressure zones relative to the wing 28 in VTOL mode will facilitate lift.

The leading unit mounting structure includes a leading swing arm 60 operatively connected to the leading-edge propulsion unit 50. The leading swing arm 60 has a leading swing pivot 62 disposed adjacent the front spar 38 and is pivotally connected at its other end to the leading-edge propulsion unit 50. The leading swing arm 60 can take many different forms. In the examples of FIGS. 1-5, the leading swing arm 60 is depicted in the form of a telescopic device. That is, the leading swing arm 60 could, in an embodiment, be length adjustable such as by a jack screw or hydraulic or pneumatic arrangement. In another embodiment, the leading swing arm 60 could be configured as a non-telescopic structure. This is shown, for example, in FIGS. 8-10. The non-telescopic version of the leading swing arm 60 could, for example, have a sturdy triangular design to better withstand the rigors of use. However, other designs may be found adequate to suit the purposes of this invention. In any configuration, length-adjustable or otherwise, it is preferable to form the leading swing arm 60 with an aerodynamic shape. The aerodynamic shape can be any suitable, efficient and structurally sound design. In one example, the aerodynamic shape is defined by a wedge-like forward edge as depicted in the cross-section of FIG. 10.

The leading unit mounting structure also includes a leading linear actuator 64. The leading linear actuator 64 is operatively connected to the leading-edge propulsion unit 50. This operative connection can take the form a pivoted joint, or some other suitable type of interface. The other end of the leading linear actuator 64 terminates at or near a leading actuator pivot 66 disposed adjacent the aft spar 38. Together, the leading swing arm 60 and leading linear actuator 64 form a mechanized linkage that supports the leading-edge propulsion unit 50 in its respective forward flight (FIG. 4) and VTOL (FIG. 5) positions. This linkage carefully guides movement of the leading-edge propulsion unit 50 as it moves between these forward flight and VTOL positions.

The leading linear actuator 64 could take any of numerous forms to provide controlled length adjustment, including but not limited to hydraulic and pneumatic arrangements. In the illustrated example of FIG. 8, the leading linear actuator 64 takes the advantageous form of a jack screw. In this screw jack embodiment, a driving motor 68 is used to turn either a male screw shaft or a threaded female sleeve. The driven threaded feature rotates with driving motor 68 while the other threaded feature is pivotally attached to the motor 54 or some other feature associated with the leading-edge propulsion unit 50. The driving motor 68 of the leading linear actuator 64 is preferably located directly adjacent the leading actuator pivot 66. An electric driving motor 68 and jack screw arrangement is considered advantageous because of its inherent structural integrity and reliability. By selectively lengthening leading linear actuator 64, with or without length adjustment of the leading swing arm 60, the leading-edge propulsion unit 50 is caused to swing in a controlled path between its VTOL and forward flight modes.

Figure 8:
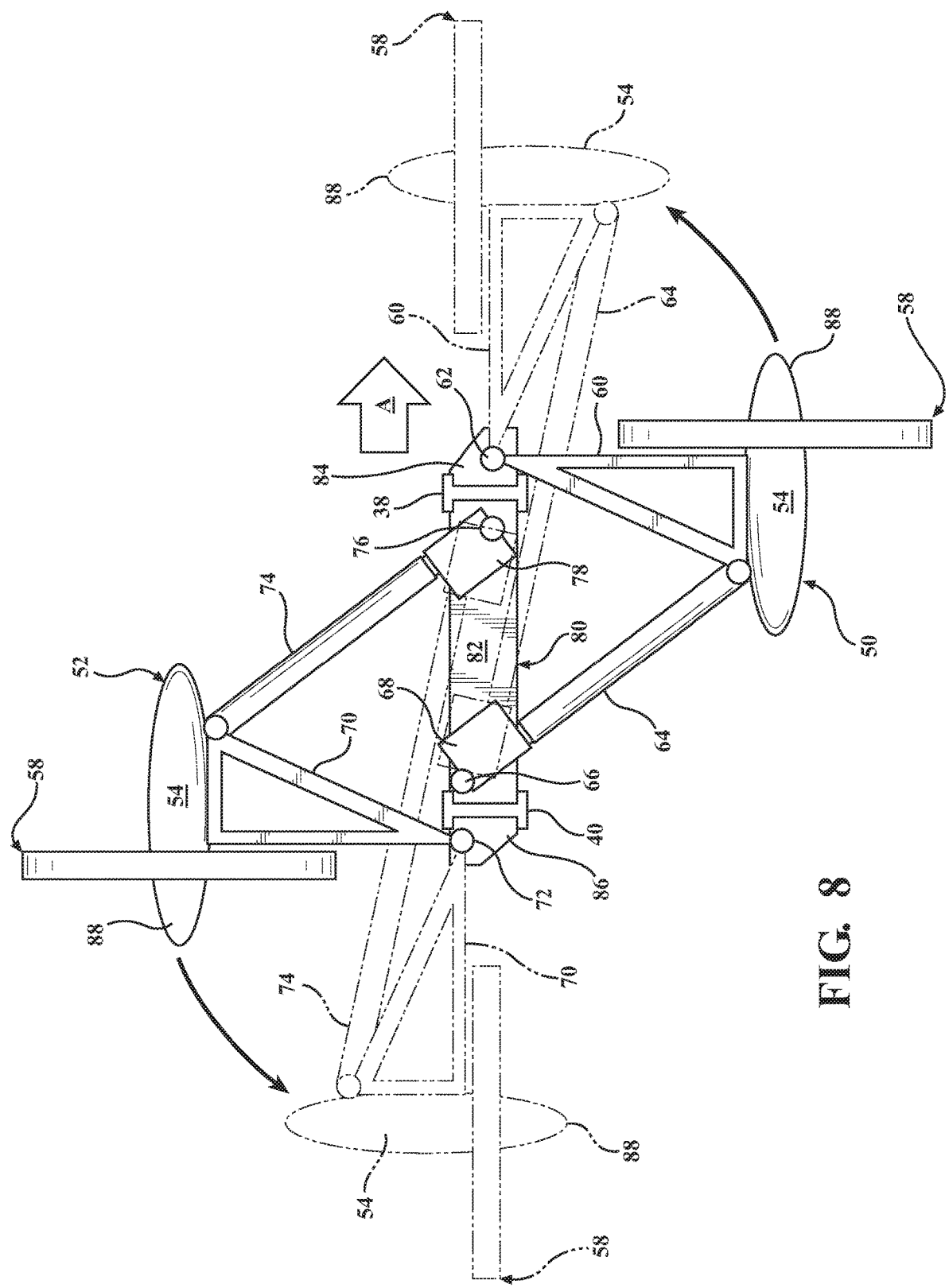
FIG. 8 is a highly simplified side view of a combination VTOL and forward flight propulsion system according to another embodiment of the invention, with the propulsion systems depicted in VTOL mode in solid lines and forward flight mode in phantom lines.
Figure 9:
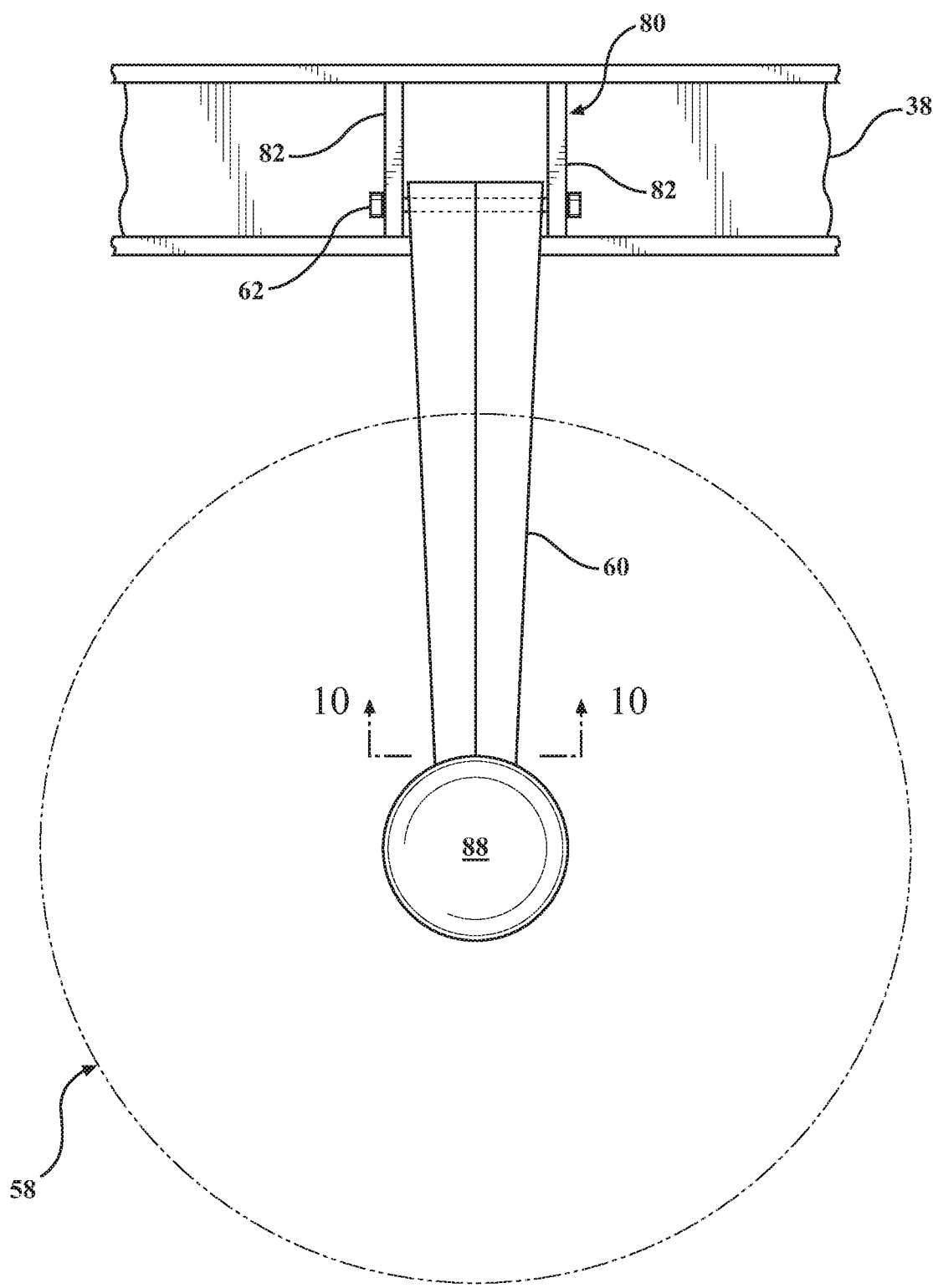
FIG. 9 is a simplified front view taken generally along lines 9-9 in FIG. 7.
Figure 10:
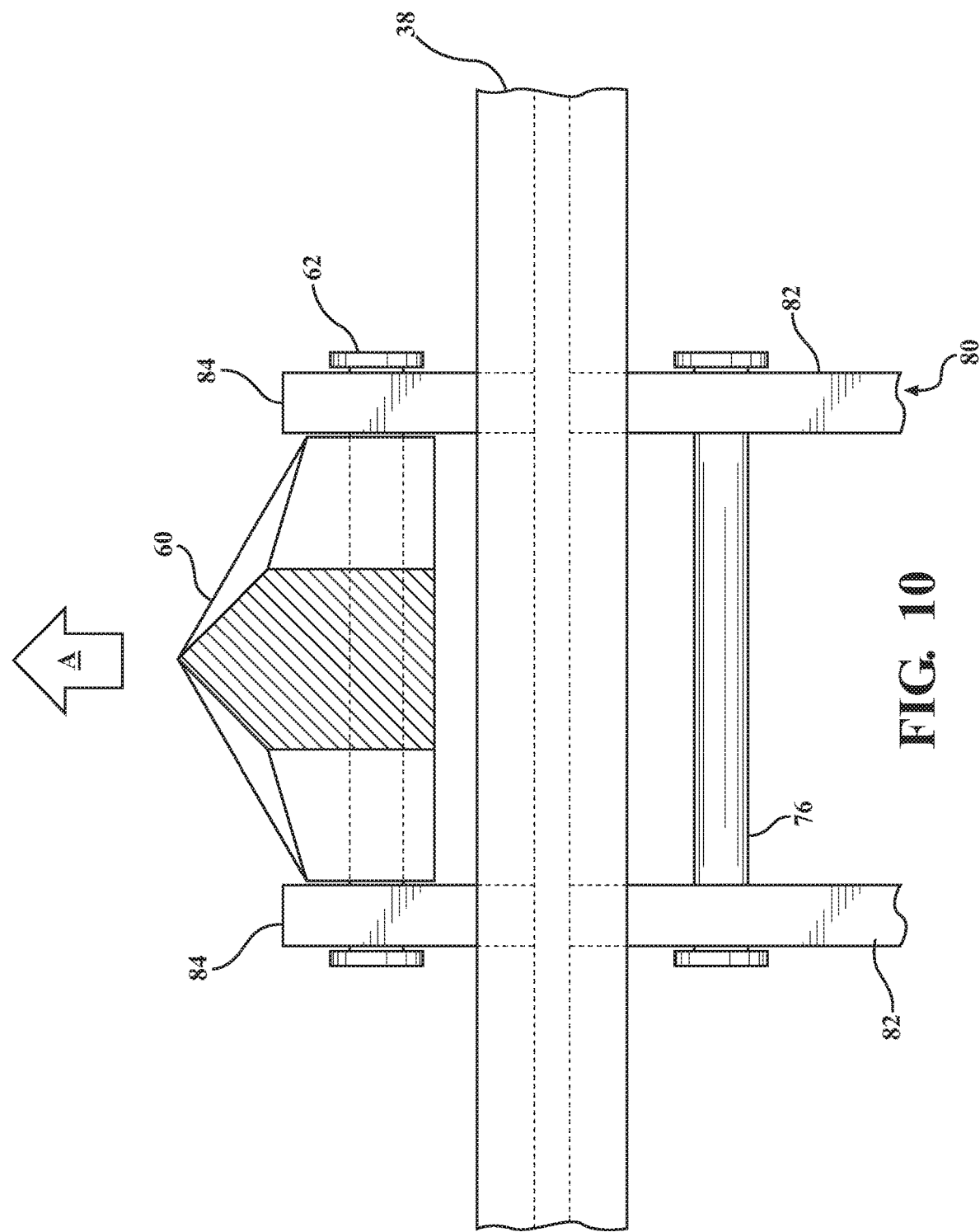
FIG. 10 is simplified cross-sectional view taken generally along lines 10-10 in FIG. 9 to illustrate one possible aerodynamic shape of the leading swing arm.
Figure 11:
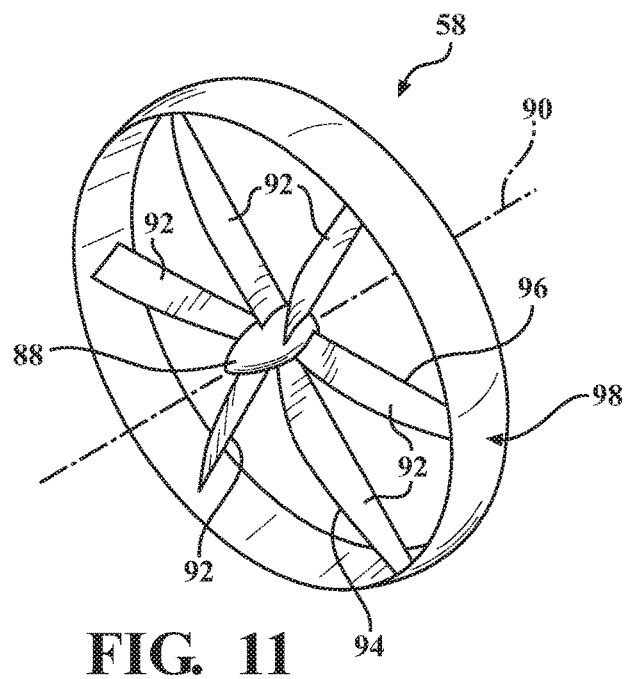
FIG. 11 is a perspective view of a propeller according to an embodiment of the invention and configured as a puller.
Figure 12:
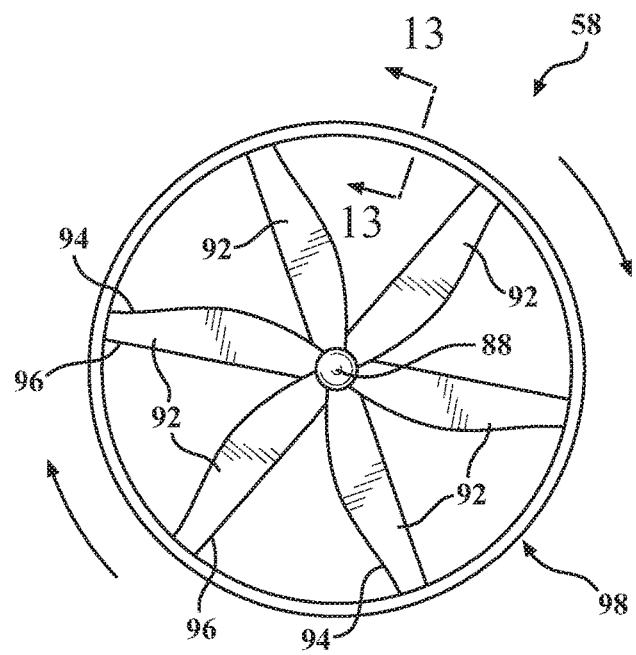
FIG. 12 is a front view of the propeller of FIG. 11.

As best seen in the side view of FIG. 8, which forms one exemplary embodiment of the invention, the leading swing pivot 62 is disposed on a forward side of the front spar 38. It may be further advantageous to locate the leading swing pivot 62 proximate the lower surface 32 of the main wing 28. By locating the leading swing pivot 62 on the forward-facing side of the front spar 38 and adjacent the lower surface 32 of the wing 28, the leading swing arm 60 is provided the greatest position of clearance to sweep around the leading edge 34 as it articulates between VTOL and forward flight modes. Or, alternatively, it may be desirable to instead position the leading swing pivot 62 at some other position within the main wing 28.

Still considering the example of FIG. 8, the leading actuator pivot 66 may be disposed on a forward side of the aft spar 40, proximate the upper surface 30 of the main wing 28. By locating the leading actuator pivot 66 on the forward-facing side of the aft spar 40 and adjacent the upper surface 30 of the wing 28, the leading linear actuator 64 is provided the greatest mechanical advantage and reach from which to control movement of the leading-edge propulsion unit 50 as it articulates between VTOL and forward flight modes. Or, alternatively, it may be desirable to instead position the leading actuator pivot 66 at some other position within the main wing 28.

Referring once again to FIGS. 1-5, the trailing-edge propulsion unit 52 will be described in greater detail. To facilitate descriptions, throughout this document features relating specifically to the trailing-edge propulsion unit 52 will be named with the word "trailing." The trailing-edge propulsion unit 52 includes a trailing unit mounting structure that supports the trailing-edge propulsion unit 52 for articulated movement between its VTOL and forward flight positions. This functionality of the trailing unit mounting structure is perhaps best seen in FIG. 3 where the trailing-edge propulsion unit 52 is shown in the VTOL position in solid lines, and in the forward flight position in broken lines.

When in the forward flight position, the trailing-edge propulsion unit 52 is located above the main wing 28, proximate its trailing edge 36. Ideally, the propeller 58 of the trailing-edge propulsion unit 52 will be located so that its maximum diameter is at or above a horizontal tangent line D as shown in FIG. 4. The horizontal tangent line D touches the highest point of the upper surface 30 of the wing 28. Air drawn in through the propeller 58 of the trailing-edge propulsion unit 52 during forward flight will develop a low-pressure zone above the wing 28 and a corresponding high-pressure zone behind the main wing 28. In addition to the forward thrust generated by the trailing-edge propulsion unit 52, the strategic arrangement of low- and high-pressure zones relative to the wing 28 in forward flight mode will facilitate forward flight as well as lift.

When in the VTOL position, the trailing-edge propulsion unit 52 is located behind the trailing edge 36 of the main wing 28, preferably slightly below the trailing edge 36. Ideally, the propeller 58 of the trailing-edge propulsion unit 52 will be located so that its maximum diameter is at or behind a vertical tangent line E as shown in FIG. 5. Air drawn in through the propeller 58 on the trailing-edge propulsion unit 52 during VTOL will develop a low-pressure zone above the upper surface 30 of the wing 28 and a corresponding high-pressure zone below the lower surface 32 of the main wing 28. The strategic arrangement of low- and high-pressure zones relative to the wing 28 in VTOL mode will facilitate lift, especially in tandem with the low- and high-pressure zones created by the leading-edge propulsion unit 50 in VTOL mode.

The trailing unit mounting structure includes a trailing swing arm 70 operatively connected to the trailing-edge propulsion unit 52. The trailing swing arm 70 has a trailing swing pivot 72 disposed adjacent the aft spar 40 and is pivotally connected at its other end to the trailing-edge propulsion unit 52. The trailing swing arm 70 can take many different forms. In the examples of FIGS. 1-5, the trailing swing arm 70 is depicted in the form of a telescopic device. That is, the trailing swing arm 70 could, in an embodiment, be length adjustable such as by a jack screw or hydraulic or pneumatic arrangement. In another embodiment, the trailing swing arm 70 could be configured as a non-telescopic structure. This is shown, for example, in FIGS. 8-10. The non-telescopic version of the trailing swing arm 70 could, for example, have a sturdy triangular design to better withstand the rigors of use. However, other designs may be found adequate to suit the purposes of this invention. In any configuration, length-adjustable or otherwise, it is preferable to form the trailing swing arm 70 with an aerodynamic shape. The aerodynamic shape can be any suitable, efficient and structurally sound design. In one example, the aerodynamic shape is defined by a wedge-like forward edge inspired by that depicted in the cross-section of the leading swing arm 60 in FIG. 10.

The trailing unit mounting structure also includes a trailing linear actuator 74. The trailing linear actuator 74 is operatively connected to the trailing-edge propulsion unit 52. This operative connection can take the form a pivoted joint, or some other suitable type of interface. The other end of the trailing linear actuator 74 terminates at or near a trailing actuator pivot 76 disposed adjacent the front spar 38. Together, the trailing swing arm 70 and trailing linear actuator 74 form a mechanized linkage that supports the trailing-edge propulsion unit 52 in its respective forward flight (FIG. 4) and VTOL (FIG. 5) positions. This linkage carefully guides movement of the trailing-edge propulsion unit 52 as it moves between these forward flight and VTOL positions.

The trailing linear actuator 74 could take any of numerous forms to provide controlled length adjustment, including but not limited to hydraulic and pneumatic arrangements. In the illustrated example of FIG. 8, the trailing linear actuator 74 takes the advantageous form of a jack screw. In this screw jack embodiment, a driving motor 78 is used to turn either a male screw shaft or a threaded female sleeve. The driven threaded feature rotates with driving motor 78 while the other threaded feature is pivotally attached to the motor 54 or some other feature associated with the trailing-edge propulsion unit 52. The driving motor 78 of the trailing linear actuator 74 is preferably located directly adjacent the trailing actuator pivot 76. An electric driving motor 78 and jack screw arrangement is considered advantageous because of its inherent structural integrity and reliability. By selectively lengthening trailing linear actuator 74, with or without length adjustment of the trailing swing arm 70, the trailing-edge propulsion unit 52 is caused to swing in a controlled path between its VTOL and forward flight modes.

As best seen in the exemplary side view of FIG. 8, the trailing swing pivot 72 is disposed on a rearward side of the aft spar 40. It may be further advantageous to locate the trailing swing pivot 72 proximate the upper surface 30 of the main wing 28. By locating the trailing swing pivot 72 on the rearward-facing side of the aft spar 38 and adjacent the upper surface 30 of the wing 28, the trailing swing arm 70 is provided the greatest position of clearance to sweep around the trailing edge 36 as it articulates between VTOL and forward flight modes. Or, alternatively, it may be desirable to instead position the trailing swing pivot 72 at some other position within the main wing 28.

Still considering the example of FIG. 8, the trailing actuator pivot 76 may be disposed on a rearward side of the front spar 38, proximate the lower surface 32 of the main wing 28. By locating the trailing actuator pivot 76 on the forward-facing side of the aft spar 40 and adjacent the upper surface 30 of the wing 28, the trailing linear actuator 74 is provided the greatest mechanical advantage and reach from which to control movement of the trailing-edge propulsion unit 52 as it articulates between VTOL and forward flight modes. Or, alternatively, it may be desirable to instead position the trailing actuator pivot 76 at some other position within the main wing 28. In the preferred positioning of the pivots 62, 64, 72, 72 shown in FIG. 8, it will be appreciated that the reaction forces imposed on opposite sides of the spars 38, 40 can be maintained close together and balanced for optimal management of loads and stresses within the wing 28 architecture. This latter observation is considered a highly beneficial feature of the present invention.

It will be appreciated that the leading and trailing unit mounting structures are independent of one another. Each mounting structure can be controlled separately, which may have certain advantages that help control the attitude of the aircraft 20 when maneuvering in extreme wind conditions. That is to say, each drive motor 68, 78 can be independently controlled so that the angular position of each propulsion unit 50, 52 is optimized for pilot control under the prevailing conditions.

Turning now to FIGS. 6-10, another highly beneficial feature of the present invention will be described in detail. More specifically, the invention may include a spar box, generally indicated at 80. Optionally, the spar box 80 may be a distinct and independent unit that fits inside the wing 28. Or alternatively, the spar box 80 can be formed by and integrated with two adjacent fortified ribs 42 inside the wing 28. The function of the spar box 80 is to mechanically interlock the leading swing pivot 62 and the leading actuator pivot 66 and the trailing swing pivot 72 and the trailing actuator pivot 76 as a unit. That is, all of the reaction forces and stresses transferred through the pivots 62, 66, 72, 76 are carried by the strong and sturdy spar box 80.

The spar box 80 fixedly interconnects the forward 38 and aft 40 spars as best shown in FIGS. 7 and 8. By interconnecting the spars 38, 40 in this manner, the spar box 80 will help distribute forces and torsions generated in use by the propulsion units 50, 52. In cases where the spar box 80 is fashioned as a distinct and independent unit to fit inside the wing 28, it may be desirable to size the width of the spar box 80 to fit neatly between two adjacent ribs 42. Fixing the sides of the spar box 80 to ribs 42 will further strengthen the wing 28 architecture in the region of each articulating propulsor pair.

The spar box 80 illustrated in the accompanying examples includes an inter-spar bridge section 82 disposed between the front and aft spars 38, 40. The spar box 80 also includes a forward cantilever section 84 adjoining the front spar 38 opposite the inter-spar bridge section 82, and an aft cantilever section 86 adjoining the aft spar 38 opposite the inter-spar bridge section 82. Said another way, the inter-spar bridge section 82 is sandwiched between the forward 84 and aft 86 cantilever sections as can be seen in FIGS. 7 and 8. In this configuration, the leading swing pivot 62 is journaled in the forward cantilever section, the leading actuator pivot 66 is journaled in the inter-spar bridge section 82, the trailing swing pivot 72 is journaled in the aft cantilever section, and the trailing actuator pivot 76 is journaled in the inter-spar bridge section 82.

Some of the many advantages of the novel arrangements of propulsion units 50, 52 and their corresponding mounting structures include the structural integrity achieved by locating the several pivots 62, 66, 72, 76 nearly directly on the front and aft spars 38, 40. The strategic placement of these pivots 62, 66, 72, 76 also enables large degrees of rotation around the X and Y axes, likely greater than 90° in some instances, which allows for controlled VTOL and forward high-speed flight. In VTOL mode, the propulsion units 50, 52 produce a low-pressure area above the wing 28 thus adding to the overall lift ability of the aircraft 20. In VTOL mode, the propulsion units 50, 52 produce a high-velocity airflow downward to produce lift. Rotating the propulsion units 50, 52 from VTOL to high speed forward flight can be accomplished by screw jacks. Various shapes/forms of screw jacks can be devised to optimize articulation and with regard to aerodynamic streamlining. In VTOL mode, the arc of the propulsion units 50, 52 can be optimized within the lower width of the wing 28 structure to assure maximum capabilities for producing a low-pressure area above the wing upper surface 30.

The spar box 80 can be designed to function as the main support structure that carries the high loads of the articulating propulsion units 50, 52. The spar box 80 can also be designed to house the driving motors 68, 78 for the screw jacks.

Still further, the novel mounting structures enable strategic positioning of the propulsion units 50, 52 in both VTOL and forward flight modes so that prop wash can be maintained clear of the aircraft structures. In both high and low speed forward flight, the pull and push of airflow is designed with respect to the airfoil of the wing 28 so that airflow is over and under creating a beneficial "blown wing" effect.

Use of direct drive motors 54 to spin the propellers 58, and in particular electric motors 54, means that all of the propulsive energy goes directly into the propulsion units 50, 52 for VTOL lift and thrust. Taking these many advantages tougher enables the aircraft 20 to take-off, fly and land into extreme headwinds due to the ability to independently vary the angular position of each propulsion unit 50, 52. Furthermore, the wide spacing of the adds to a large center of gravity (CG) loading envelope. And still further, the design placement of the leading-edge 50 and trailing-edge 52 propulsion units within the tip-to-tail perimeter of the aircraft 20 is an inherent safety feature.

As previously mentioned, a propeller 58 is fixedly attached to the output shaft 56 of the propulsor motors 54 so that the propeller 58 can be rotatably driven to produce thrust, as depicted in FIGS. 4 and 5. FIGS. 11-18 depict an optional embodiment for the propeller 58. It should be understood that the propeller 58 of FIGS. 11-18 can be used with great advantage in connection with the aforementioned combination VTOL and forward flight propulsion systems. However, the combination VTOL and forward flight propulsion systems can be made to function satisfactorily using propellers of different design. And similarly, the propellers 58 of FIGS. 11-18 can be used with great effect in aircraft applications that do not incorporate the advantageous combination VTOL and forward flight propulsion systems of this invention. Thus, it is to be clearly understood that the inventive propeller 58 features shown in FIGS. 11-18 are independent of the combination VTOL and forward flight propulsion systems of FIGS. 1-10 even though they are used in combination in the most preferred embodiments of this invention.

The propeller 58 has a hub 88 that is intended to be directly attached to the output shaft 56 along a common rotary axis 90. That is to say, the rotary axes of the hub 88 and output shaft 56 coincide when operatively joined together for use. A plurality of blades 92 extend radially from the hub 88. In one embodiment of the invention depicted in FIGS. 11 and 12, the propeller 58 is designed with six blades 92 arranged in equal angular increments of 60° about the rotary axis 90. A six-bladed propeller 58 has been found to be advantageous in certain applications. However, the propeller 58 may be designed to support any number of blades 58 in balanced distribution.

Figure 15:
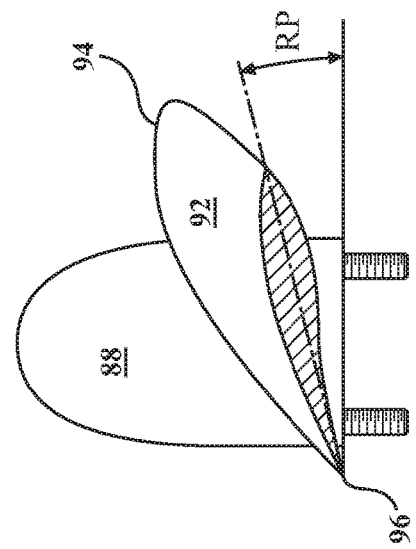
FIG. 15 is a cross-sectional view through the blade adjacent the hub as taken generally along lines 15-15 in FIG. 14 and identifying the local blade pitch (HP)
Figure 16:
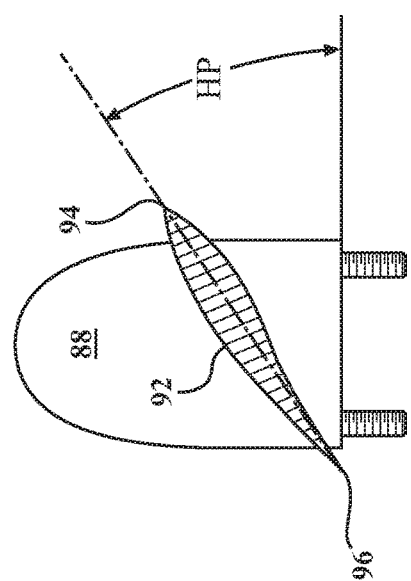
FIG. 16 is a cross-sectional view through the blade adjacent the propulsor thrust ring as taken generally along lines 16-16 in FIG. 14 and identifying the local blade pitch (RP)
Figure 14:
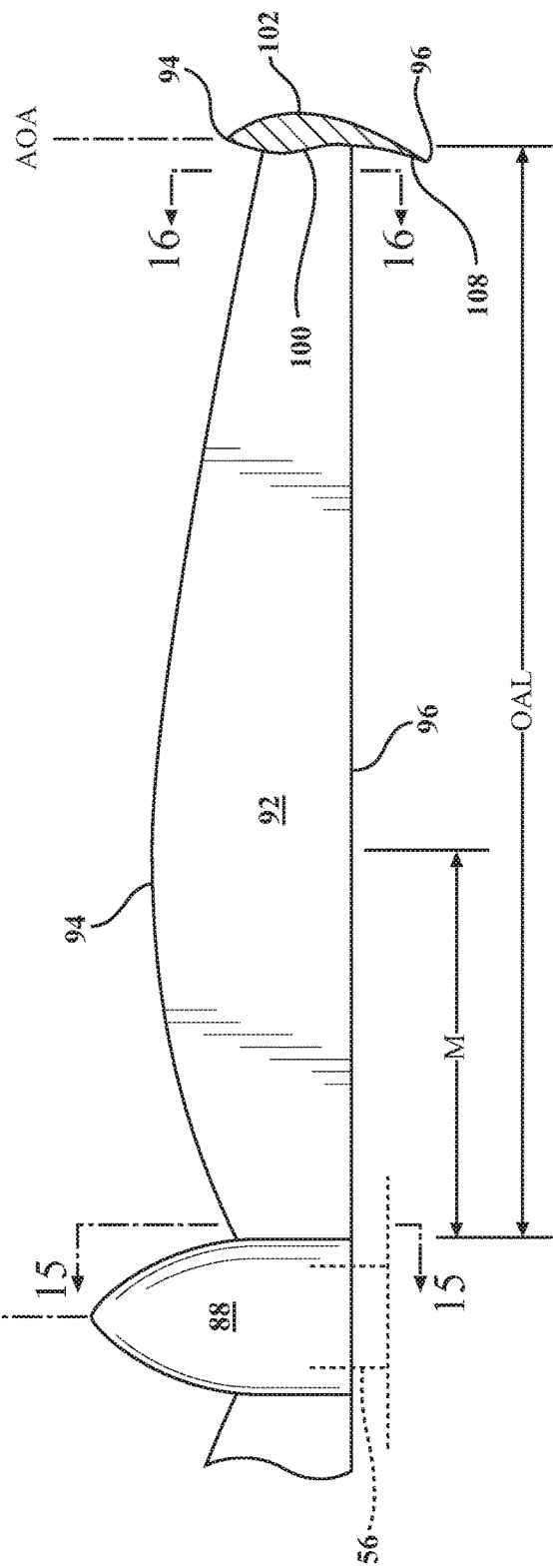
FIG. 14 is a fragmentary top view of a single blade of the propeller configured as a puller.

Each blade 92 terminates at a distal tip. The distance between hub 88 and distal tip of each blade 92 establishes an overall blade length OAL, as diagrammed in FIG. 14. FIGS. 15 and 16 are cross-sections along a blade 92, which reveal a leading blade edge 94 and a trailing blade edge 96. The shape of the blades 92 are subject to change depending on the application and other factors. However, in the exemplary embodiment the trailing blade edge 96 may be relatively straight. That is to say, the trailing blade edge 96 may lay along a generally straight line extending between the hub 88 and the distal tip of the blade 92. However, it may be desirable for improved operational efficiency or other reasons to sweep the leading blade edge 94 along a convexly curvilinear path. This curvilinear shape produces changes in the span or circumferential width of the blades 92. In one advantageous example, the leading blade edge 94 has a maximum span at a radial distance between about 0.3 and 0.4 times the overall blade length OAL as measured from the hub 80. This is perhaps best seen in FIG. 14.

Considering again FIGS. 15 and 16, it can be observed that, in some embodiments, the blade 92 many have varied blade pitch. That is, the pitch HP of the blade adjacent the hub (FIG. 15) may be greater than the pitch RP of the blade adjacent its distal end (FIG. 16). It should be noted that the orientation of the hub 88 relative to the pitch of the blade 92 is presented in the puller configuration in FIGS. 15 and 16. Representations of mounting bolts are shown extending from the bottom of the hub 88. In pusher configurations (e.g., FIG. 17), the hub 88 will appear inverted.

Another distinguishing characteristic of the propeller 58 is an annular propulsor thrust ring, generally indicated at 98. The propulsor thrust ring 98 concentrically disposed about the hub 88 and joins each of the distal tips of the blades 92 into a monolithic structure. As shown in the cross-sectional views in FIGS. 13 and 14, the propulsor thrust ring 98 has an aerodynamic cross-sectional profile when viewed in a radial plane emanating from the rotary axis 90 of the hub 88. The aerodynamic profile has many unique attributes, including a PTR angle of attack AOA that is not parallel to the rotary axis 90 of the hub 88. In particular, the PTR angle of attack AOA preferably diverges relative to the rotary axis 90 in the forward direction of flight A. That is to say, in the forward direction of flight A the distance between the PTR angle of attack AOA and the rotary axis 90 steadily increases. Divergence angles of about 1°-5° have been found to provide satisfactory results, with best result when the divergence angle is about 2°.

Figure 13:
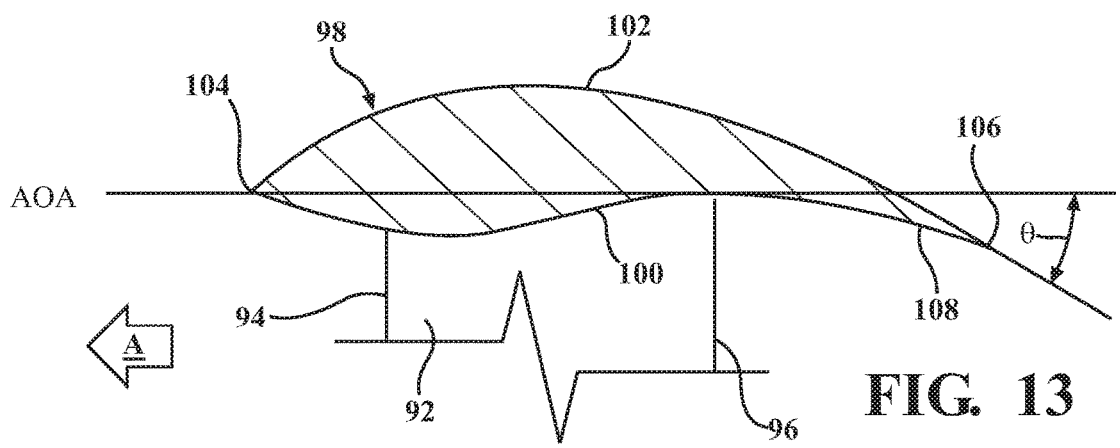
FIG. 13 is a cross-sectional view showing the profile of the propulsor thrust ring as taken generally along lines 13-13 in FIG. 12.

The aerodynamic profile of the propulsor thrust ring 98 is shown in FIG. 13 having an interior surface 100 and an exterior surface 102. About the full annular shape of the propulsor thrust ring 98, it can be seen especially in FIG. 11 that the interior surface 100 is interrupted by the distal tips of the blades 98, whereas the exterior surface 102 is generally uninterrupted about its full circumference. The interior 100 and exterior 102 surfaces of the aerodynamic profile converge at a leading rim 104 and a trailing rim 106. The interior surface 100 of the aerodynamic profile may be defined by an ogee curve that is convex adjacent the leading rim 104 and concave adjacent the trailing rim 106. The exterior surface 102 of the aerodynamic profile is defined by a continuously convex curve.

The PTR angle of attack AOA intersects or passes through the leading rim 104 but not through the trailing rim 104. Instead, the PTR angle of attack intersects the convex curve of the exterior surface 102 adjacent the trailing rim 106, as clearly shown in FIG. 13. This is because the trailing rim 106 of the propulsor thrust ring 98 is configured with a thrust nozzle 108. The thrust nozzle 108 functions to conically converge airflow toward the rotary axis 90 at a thrust angle ⊖ that is measured with respect to the PTR angle of attack AOA. That is, the thrust angle ⊖ vectors air flowing through the propulsor thrust ring 98 angularly toward the rotary axis 90.

Figure 18:
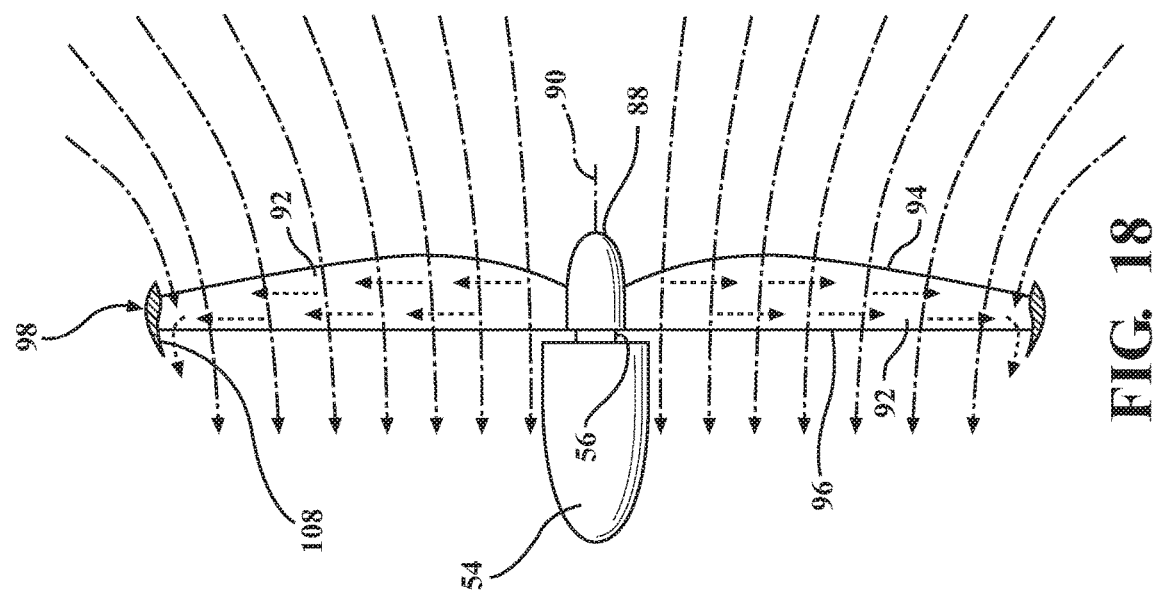
FIG. 18 is a view as in FIG. 17 but showing a propeller of the invention configured as a puller.
Figure 17:
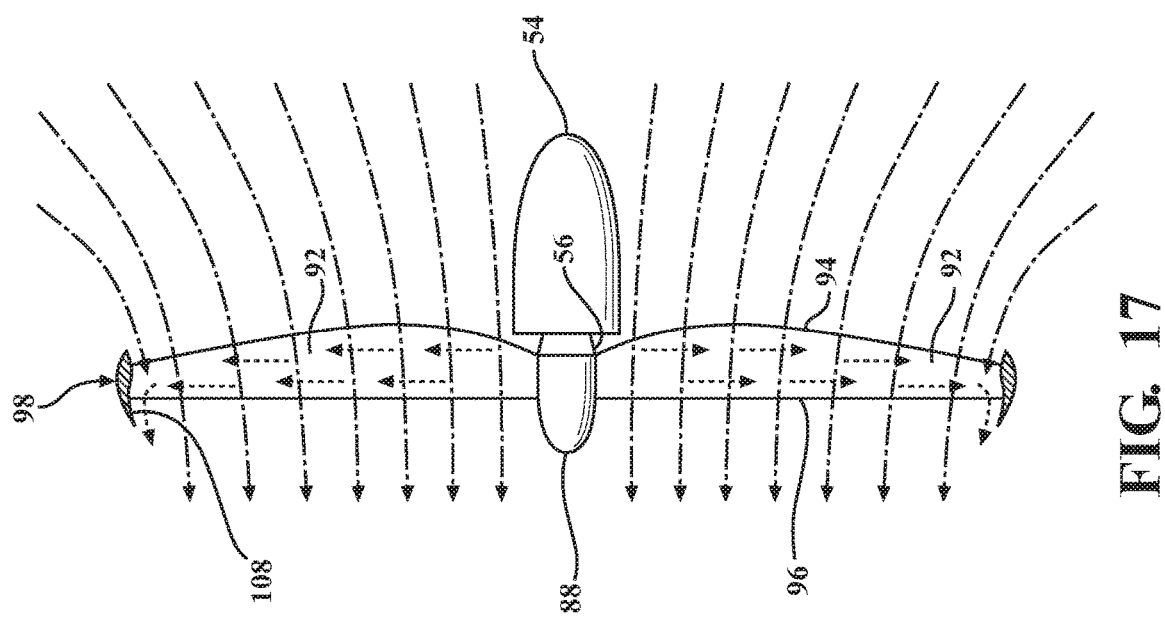
FIG. 17 is a simplified side view of a propeller of the invention configured as a pusher in partial cross-section, showing with air currents influenced by the blades and propulsor thrust ring.

FIGS. 17 and 18 are provided to help illustrate the functionality of the propulsor thrust ring 98. FIG. 17 shows a propeller 58, motor 54 and hub 88 arrangement configured as a pusher, whereas FIG. 18 shows a propeller 58, motor 54 and hub 88 arrangement in the puller configuration. Air flow through the blades 98 is expected to produce the upstream low-pressure and downstream high-pressure zones described above. However, in traditional open bladed propeller designs there is a small but significant amount of leakage that occurs when air slung radially bleeds from the tips of the blades, resulting in inefficiency. That is, in prior art designs energy put into driving the propeller results in the movement of some air that does not contribute to thrust. Thus, energy invested does not yield a valuable return. In addition to air leakage, there is also a considerable amount of sound that radiates from the propeller 58. The propulsor thrust ring 98 addresses and overcomes these issues by capturing the radial air leakage and then vectoring that radial air flows into valuable thrust. The propulsor thrust ring 98 likewise captures and deflects undesirable sounds and heat that may otherwise be directed toward the fuselage. As a result, the propeller 58 of the present invention is more efficient and quieter than traditional open bladed propeller designs.

Furthermore, the propulsor thrust ring 98 eliminates induced drag around the distal tips of the blades 92. The propulsor thrust ring 98 represents a safety improvement over traditional open bladed propeller designs. A propeller 58 of this invention coming into contact with an object is less likely to damage the propeller or the object because of the propulsor thrust ring 98 which acts like a safety rail. It has been reported that some 80% of helicopter catastrophic accidents involve main rotor contacts. The propulsor thrust ring 98 protects against catastrophic failure in the event of a contact both in air and on ground. Still further, the propulsor thrust ring 98 adds structural integrity to the propeller by connecting the distal tips of the blades 92. Similarly, the low vibration harmonics will be improved by the propeller 58 of this invention as compared with prior art designs.

For all of these reasons, the propeller 58 is desirable as an ultra-efficient propulsor having a much lower noise signature than traditional designs. As a result, the propeller 58 may be designed to rotate at slower RPM compared to standard designs and produce more thrust at lower noise levels. The propulsor thrust ring 98 portion has an airfoil shape with a high component of producing thrust as airflow exits. This enables the propulsor thrust ring 98 to produce a low-pressure area around the propeller 58 adding to its overall efficiency.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A combination VTOL and forward flight propulsion system of the type to be supported from the main wing of an aircraft, the main wing having a leading edge and a trialing edge and an upper surface and a lower surface, said propulsion system comprising:
    a leading-edge propulsion unit adapted for placement in use adjacent the leading edge of a wing,
    a trailing-edge propulsion unit adapted for placement in use adjacent the trailing edge of said wing,
    a leading unit mounting structure supporting said leading-edge propulsion unit for articulated movement between VTOL and forward flight positions, said leading unit mounting structure including a leading swing arm operatively connected to said leading-edge propulsion unit, said leading swing arm having a leading swing pivot located between said upper surface and said lower surface, said leading unit mounting structure including a leading linear actuator operatively connected to said leading-edge propulsion unit,
    a trailing unit mounting structure supporting said trailing-edge propulsion unit for articulated movement between VTOL and forward flight positions, said trailing unit mounting structure including a trailing swing arm operatively connected to said trailing-edge propulsion unit, said trailing swing arm having a trailing swing pivot, said trailing unit mounting structure including a trailing linear actuator operatively connected to said trailing-edge propulsion unit, and a spar box mechanically interlocking said leading swing pivot and said leading actuator pivot and said trailing swing pivot and said trailing actuator pivot as a unit.

2. The system of claim 1 wherein said spar box includes a forward cantilever section and an aft cantilever section and an inter-spar bridge section disposed between said forward and aft cantilever sections.

3. The system of claim 2 wherein said leading swing pivot is journaled in said forward cantilever section, said leading actuator pivot is journaled in said inter-spar bridge section, said trailing swing pivot is journaled in said aft cantilever section, and said trailing actuator pivot is journaled in said inter-spar bridge section.

4. The system of claim 1 wherein said leading swing arm is non-telescopic, said leading linear actuator includes a screw jack and a driving motor, one end of said screw jack is pivotally connected to said leading-edge propulsion unit, said trailing swing arm is non-telescopic, said trailing linear actuator includes a screw jack and a driving motor, and one end of said screw jack is pivotally connected to said trailing-edge propulsion unit.

5. The system of claim 1 wherein each of said leading- and trailing-edge propulsion units comprises a motor having an output shaft, a propeller fixedly attached to said output shaft for driven rotation, said propeller having a hub directly attached to said output shaft along a common rotary axis, a plurality of blades extending radially from said hub, each said blade terminating at a distal tip, an annular propulsor thrust ring concentrically disposed about said hub, said propulsor thrust ring having an aerodynamic cross-sectional profile as taken in a radial plane intersecting said rotary axis of said hub, said aerodynamic profile having a PTR angle of attack (AOA) that is diverging relative to said rotary axis of said hub in the forward direction of flight, said aerodynamic profile having an interior surface and an exterior surface, said interior and exterior surfaces of said aerodynamic profile converging at a leading rim and a trailing rim, said interior surface of said aerodynamic profile defined by an ogee curve, said ogee curve being convex adjacent said leading rim and concave adjacent said trailing rim, said trailing rim having thrust nozzle conically converging airflow toward said rotary axis at a thrust angle ($\Theta$) measured with respect to said PTR angle of attack (AOA).

6. The system of claim 1 wherein said leading-edge propulsion unit is configured as an air puller and said trailing-edge propulsion unit configured as an air pusher.

7. A fixed wing assembly for an aircraft capable of vertical take-off and landing (VTOL) maneuvers and forward flight, said assembly comprising:
a main wing having an upper surface and an opposite lower surface, said upper surface configured to produce lift by accelerating the free flow of air thereover relative to said lower surface, said main wing having a leading edge and a trailing edge, said main wing having a front spar and an aft spar, said front and aft spars arranged generally parallel to one another,
a combination VTOL and forward flight propulsion system supported from said main wing, said propulsion system including at least one articulating propulsor pair operatively stationed on said main wing, each said articulating propulsor pair comprising a leading-edge propulsion unit adjacent said leading edge of said wing and a trailing-edge propulsion unit adjacent said trailing edge of said wing, a leading unit mounting structure supporting said leading-edge propulsion unit for articulated movement between VTOL and forward flight positions, said leading unit mounting structure including a leading swing arm operatively connected to said leading-edge propulsion unit, said leading unit mounting structure including a leading linear actuator operatively connected to said leading-edge propulsion unit, a trailing unit mounting structure supporting said trailing-edge propulsion unit for articulated movement between VTOL and forward flight positions, said trailing unit mounting structure including a trailing swing arm operatively connected to said trailing-edge propulsion unit, said trailing unit mounting structure including a trailing linear actuator operatively connected to said trailing-edge propulsion unit, said leading swing arm having a leading swing pivot disposed between said upper surface and said lower surface, and adjacent said front spar, said leading linear actuator having a leading actuator pivot disposed adjacent said aft spar, and said trailing swing arm having a trailing swing pivot disposed adjacent said aft spar, said trailing linear actuator having a trailing actuator pivot disposed adjacent said front spar.

8. The assembly of claim 7 wherein said leading swing pivot is disposed on a forward side of said front spar, said leading actuator pivot is disposed on a forward side of said aft spar, said trailing swing pivot is disposed on a rearward side of said aft spar, and said trailing actuator pivot is disposed on a rearward side of said front spar.

9. The assembly of claim 8 wherein said leading swing pivot disposed proximate said lower surface of said main wing, said leading actuator pivot disposed proximate said upper surface of said main wing, said trailing swing pivot disposed proximate said upper surface of said main wing, said trailing actuator pivot disposed proximate said lower surface of said main wing.

10. The assembly of claim 7 further including a spar box mechanically interlocking said leading swing pivot and said leading actuator pivot and said trailing swing pivot and said trailing actuator pivot as a unit.

11. The assembly of claim 10 wherein said spar box fixedly interconnects said front and aft spars.

12. The assembly of claim 11 wherein said spar box includes a forward cantilever section and an aft cantilever section and an inter-spar bridge section disposed between said forward and aft cantilever sections.

13. The assembly of claim 12 wherein said leading swing pivot is journaled in said forward cantilever section, said leading actuator pivot is journaled in said inter-spar bridge section, said trailing swing pivot is journaled in said aft cantilever section, and said trailing actuator pivot is journaled in said inter-spar bridge section.

14. The assembly of claim 7 wherein said leading swing arm is non-telescopic, said leading linear actuator includes a screw jack and a driving motor, one end of said screw jack is pivotally connected to said leading-edge propulsion unit, said trailing swing arm is non-telescopic, said trailing linear actuator includes a screw jack and a driving motor, and one end of said screw jack is pivotally connected to said trailing-edge propulsion unit.

15. The assembly of claim 14 wherein said driving motor of said leading linear actuator is located directly adjacent said leading actuator pivot, and said driving motor of said trailing linear actuator is located directly adjacent said trailing actuator pivot.

16. The assembly of claim 7 wherein each of said leading- and trailing-edge propulsion units comprises a motor having an output shaft, a propeller fixedly attached to said output shaft for driven rotation, said propeller having a hub directly attached to said output shaft along a common rotary axis, a plurality of blades extending radially from said hub, each said blade terminating at a distal tip, an annular propulsor thrust ring concentrically disposed about said hub, said propulsor thrust ring having an aerodynamic cross-sectional profile as taken in a radial plane intersecting said rotary axis of said hub, said aerodynamic profile having a PTR angle of attack (AOA) that is diverging relative to said rotary axis of said hub in the forward direction of flight, said aerodynamic profile having an interior surface and an exterior surface, said interior and exterior surfaces of said aerodynamic profile converging at a leading rim and a trailing rim, said interior surface of said aerodynamic profile defined by an ogee curve, said ogee curve being convex adjacent said leading rim and concave adjacent said trailing rim, said trailing rim having thrust nozzle conically converging airflow toward said rotary axis at a thrust angle ($\Theta$) measured with respect to said PTR angle of attack (AOA).

17. The assembly of claim 7 wherein said leading-edge propulsion unit is configured as an air puller and said trailing-edge propulsion unit configured as an air pusher.

* * * * *